United States Patent Office 3,677,992
Patented July 18, 1972

3,677,992
POLYAMIDE-IMIDE COMPOSITIONS CONTAINING COATABILITY AIDS
Edwin F. Morello, Whiting, Ind., assignor to Standard Oil Company, Chicago, Ill.
No Drawing. Filed Apr. 7, 1971, Ser. No. 132,164
Int. Cl. C08g 51/34
U.S. Cl. 260—32.8 N    6 Claims

ABSTRACT OF THE DISCLOSURE

The coatability of an amide-imide polymeric coating on a magnet wire is substantially improved by the addition of aromatic ketones having a boiling range of about 200° C. to 310° C. or monohydric alcohols boiling in the range of about 75° C. to 150° C. or utilizing a mixture of both.

---

This invention relates to aromatic polytrimellitamide-imide polymers and their use in producing insulation on wire and other surfaces and more particularly relates to the use of aromatic ketones having a boiling range of about 200° C. to 310° C. or alcohols boiling in the range of about 75° C. to 150° C. or a mixture of both as coatability aids in an amide-imide magnet wire coating composition.

The polymers may be described as polyamides having some polyimide linkages; said polyamides are capable, when heated, of conversion to the polyamide-imide form. Such polyamides are high molecular weight polymeric compounds having in their molecules units of

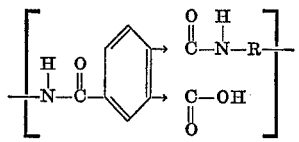

wherein → denotes isomerism and wherein R is a divalent aromatic organic radical. This organic radical consists of R', which is a divalent aromatic hydrocarbon radical or two R' divalent aromatic hydrocarbon radicals joined by stable linkages

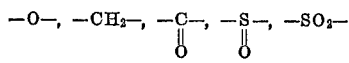

and

as are in the groups

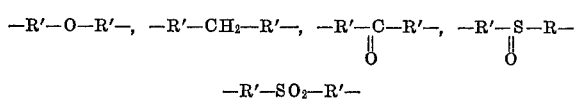

and

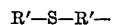

The molecular weight of these polyamides is sufficiently high to produce upon heating a film-forming polymer. Said amides are susceptible to condensation by heating to a polyamide-imide having to a substantial extent recurring units of

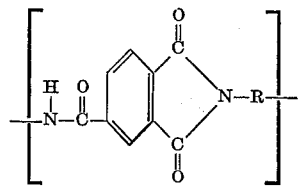

wherein R is a divalent aromatic organic radical in which in addition to hydrogen, nitrogen, sulfur and oxygen atoms can be attached to the carbon atoms. This organic radical consists of R', which is a divalent aromatic hydrocarbon radical of two R' divalent aromatic hydrocarbon radicals joined by stable linkages

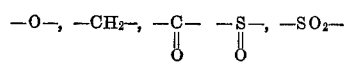

as are in the groups

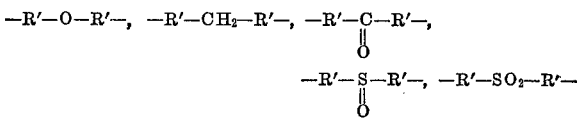

and

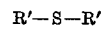

It has been found that the aforementioned polyamide-imide polymers in cresol or phenol solvent show a tendency to blister and also give rough surface coatings. This has been a serious drawback in the utilization of these inexpensive solvents in the amide-imide wire enamel field. When the aforementioned polymers are prepared by reacting the acyl halide derivative of trimellitic anhydride and an aromatic diamine in the presence of solvent, particularly ortho, meta or para cresol, the resulting wire enamel solution when coated on a wire should be amenable to ordinary winding and normal abuse, when placed on a wire. This means that the polymer insulation should show none or very low blistering and not give a rough surface. This is especially true at fast wire coating speeds used in production coating machines. Good magnet wire, whatever the type, should be smooth and relatively free from film defects.

It has been found that incorporating about 0.5 to about 5 percent by weight of the total coating composition of an aromatic ketone having a boiling range of about 200° C. to about 310° C. with the polyamide, polyamide-imide cresol or phenol coating solution significantly reduces the blistering of such coatings. The incorporation of about 0.5 to 7 percent by weight of the total coating composition of an alcohol having a boiling range of about 75° C. to 150° C. reduces the surface roughness or sandiness of such coatings. Mixtures of both the ketones and monohydric alcohols complement each other and improve the overall coating quality.

The preferred amount of ketone and monohydric alcohol used is about 1 to 3 and 2 to 5 percent by weight respectively.

The ketone and alcohol cosolvents produce coatings which when applied as an overcoat on electrical wires produces commercial grade wire without blisters or other imperfections. When only a sole coat was used good wires were also produced which showed few blisters and slight sandiness.

The overcoat system consist of about 60 to 90 percent of a conventional polyester or polyester imide disclosed in U.S. Pat. 3,382,203 and the references therein cited. The topcoat consist of about 40 to 10 percent of the polyamide-imide described herein.

The general formula for the useful ketones can be represented as follows:

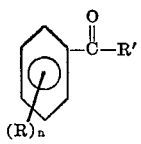

R can be an aliphatic hydrocarbon, hydrogen or a halogen, $n$ is an integer between 0 and 5 and R' can be an aliphatic or aromatic hydrocarbon or halogen substituted aliphatic or aromatic organic radical.

All the useful ketones should have a boiling point between about 200° C. and 310° C. Representative ketones include acetophenone, benzophenone, p-methyl-acetophenone, p-ethylacetophenone, 2,4-dimethylacetophenone and methyl-acetylbenzoate.

The useful monohydric alcohols include those having a boiling point between 75° C. and 150° C. Representative alcohols include ethyl alcohol, n-propyl alcohol, isopropyl alcohol, allyl alcohol, n-butyl alcohol, isobutyl alcohol, sec-butyl alcohol, t-butyl alcohol, n-amyl alcohol, isoamyl alcohol, t-amyl alcohol, n-hexyl alcohol and cyclohexanol.

A rapid cure cycle glass panel test was devised to screen cosolvents. In this test, polymer solutions cast on glass panels were placed directly into a 500° F. oven and were observed for blisters. Normally, a 0.8 to 1.2 mil film blisters severly under these conditions. Use of 1% acetophenone (B.P. 202° C.) in this test reduced blistering significantly and 2% cosolvent gave essentially smooth panels. Higher boiling ketones, such as benzophenone (B.P. 300° C.) were also effective at the lower 1% level.

Trial wire coating data is shown in Tables I, II, III and IV. Wire coating was done both in the overcoat and sole coat wire configurations. The latter type is a more severe test as thicker coatings of the polyamide-imide polymer are more prone to blistering. In the sole coat configuration without the ketone cosolvent, blistered wire was produced. This is shown in Tables I and II. A 1-2% concentration acetophenone essentially eliminates blistering of coated wire at wire speeds of 30 ft./min. The higher boiling benzophenone and p-methylacetophenone also reduced blistering.

The polyamide-imide overcoat system is less sensitive to blistering except at high wire speeds and is generally used to take advantage of the excellent thermal properties of the amide-imide. Coating speed therefor gives a measure of coatability. This data is shown in Tables III and IV. The amount of cosolvent additives needed for good coatability are somewhat influenced by the oven design. However, the results are confirmed using various length ovens. The results on the 24 ft. vertical oven have been reproduced with slightly different additive levels on a 14 ft. vertical oven.

The polyamide-imides are suitably prepared by reacting an acyl derivative of the benzene tricarboxylic acid anhydride and an aromatic diamine in the presence of organic solvent such as alkyl substituted phenols, ortho, meta or para cresol, and cresylic acid. The reaction is suitably carried out at a temperature of about 0° to 70° C. The structure of the amine also affects the rate of reaction.

The preferred primary aromatic diamines are p,p'-methylenebis(aniline), p,p'-oxybis(aniline) and p,p'-amino phenylsulfone. The preferred solvents are phenol, o-, p-, m-cresols, xylenols, either singly or as mixtures thereof commonly known as cresylic acids. The usual solvent identified as cresylic acid 9PX contains about 48–55% phenols, 15–33% ortho, meta and para-cresol and 9–19% xylenols and about 5% other $C_9$ substituted phenols. The phenol or alkyl substituted phenols may be diluted with aromatic hydrocarbons. The preferred hydrocarbons are xylene, toluene and commercial aromatic hydrocarbon fractions. The reactants are preferably present in essentially an equimolar ratio. Variations with limits of plus or minus 3 mole percent of either starting material will usually have only minor effect on product property. Variations as high as plus or minus 10 mole percent may be suitable for less demanding applications than wire coating enamel from the standpoint of high flexural requirements. The hydrogen chloride can be removed as shown in U.S. Pat. 3,494,890. In a variation of this procedure after the polymer has formed, water is added in about 1 to 5 weight percent, and is suitably allowed to digest for a few hours. Alkylene oxide is then added using from about 0 to 10% excess of that determined to neutralize the theoretical amount of hydrogen chloride produced. The amount of alkylene oxide added is calculated from the acid factor value. The polymers as formed have an amide content which varies from 55 to 100% and the imide content is from 0 to 45 percent. The polyamide-imide after heat curing theoretically contains 50 percent amide linkages and 50 percent imide linkages.

The first type of polymers produced may be defined as those soluble in organic solvents and capable of further reaction upon application of heat. They may be employed in solution, in high solids suspensions, or as powders in the production of coatings, laminates, film, fibers, molded products and as impregnating varnishes. The second type of polymers—the polyamide-imides—are much less soluble than the amides and when they have been heat cured they are generally insoluble in organic solvents and may be regarded as cured end-product in the way of coatings, laminates, films, enamel-wire coatings and the like. The latter are characterized by resistance to solvents, by high thermal stability and good electrical characteristics.

The acyl halide derivatives are reacted in the phenol or alkyl substituted phenols solvent with an aromatic diamine having one or more aromatic rings and two primary amino groups. These aromatic diamines have the formula

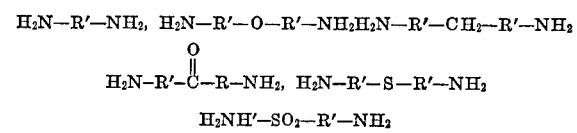

and

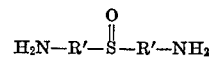

wherein R' is a divalent aromatic hydrocarbon radical hereinbefore indicated. The aromatic content of the diamine provides the thermal properties in the polymer while the primary amino groups permit the desired imide rings and the amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary aromatic rings which may be interconnected by condensation, as in naphthalene or phenanthrene type structures, or may be bridged, either directly as in diphenyl diamines, or indirectly as, for example, two R' groups joined with unreactive stable linkages such as oxy, alkyl, carbonyl, sulfonyl and other relatively inactive groups such as sulfide group, as hereinbefore described. The alkyl group may be illustrated by methylene, ethylene, substituted derivatives such as dimethylmethylene, and the like. Suitable nuclei, the R' divalent aromatic hydrocarbon radical, include phenylene, naphthylene, anthrylene, naphthacenylene and the like; diphenylene, terephenylene, phenylnaphthalene, quarterphenylene and the like; and aromatic rings separated by oxy, alkyl, carbonyl, sulfonyl and thio groups. Advantageously the linkages between the aromatic groups are oxy or methylene and the amino groups are in the meta or para position on the aromatic nucleus.

The polyamide polymers have molecular weights above about 5,000 and the polyamide-imide polymers have molecular weight in excess of about 9,000. The defined polyamide of the first reaction as described hereinabove is soluble in organic solvents. Using the aromatic carbocyclic alcohols as solvents, solutions containing about 12 to about 30 percent solids by weight are obtainable. For applications requiring use of solutions for producing wire coatings, impregnating varnishes and the like, solutions of about 15 to about 28 weight percent and advantageously about 20 percent are desired. Such concentrations provide solutions with a good balance between solids content and solution viscosity for ease of handling in most practical applications. The viscosities for such solutions are in the range of about 3 to about 150 poises. For example, the viscosity of phenol-cresol solutions having about 17 percent solids is about 30 poises at a temperature of 25° C.

The invention is further illustrated by the following examples.

EXAMPLE I

In a nitrogen atmosphere 1.48 moles of the acid chloride of trimellitic anhydride is added to a 1.48 mole solution of methylenebisaniline in 2040 cc. (2150 g.) of cresylic acid solvent (9PX). Two hours is required for addition and cooling is needed to maintain the temperature at 50° C. After addition is complete, heat is applied as needed and reaction temperature maintained at 50° C. for an additional 2 hours. Fifty-three grams of water is then added and the solution digested at 50° C. for three hours. The solution has a greenish haze at this point. The reaction mixture is cooled to ambient temperature and ninety grams (3.5% excess) of propylene oxide is slowly added. Stirring is continued and viscosity increases over several hours to a Brookfield level of 9.5 poises at 23.3° C.

Solutions for wire coating were prepared by diluting to a 17–18% polymer level. The wires were coated on a 24 ft. vertical oven, 6 passes were used to coat the wire. In sole coat configuration all 6 coats were polyamide-imide. Four coats of a tris hydroxy ester isocyanurate polyester were used as the base coat for the overcoat configuration coating and 2 passes of the polyamide-imide polymer described herein were used as the top coat. The base coat was prepared from tris (2 hydroxy ethyl) isocyanurate (2) terephthalic acid or isophthalic acid, oxybis aniline or methylenebis aniline and trimellitic anhydride as shown in U.S. Pat. 3,426,098.

In Examples II to XXX the coatings were prepared as in Example I except that where indicated a given amount of the high boiling aromatic ketone or the monohydric alcohol were added. Under Tables I, II, III and IV under heading "Comments" the coatings are evaluated for coatability.

TABLE I.—SOLE COAT WIRE TESTS

| Example Number | Cosolvent | Percent solids | Viscosity, poises | Speed, f.p.m. | Cure temperature, °F. | Bot temperature, °F. | Build, mil | Comments |
|---|---|---|---|---|---|---|---|---|
| II | None | 17.5 | 7.6 | 30 | 650 | 500 | 2.4 | Very bad coating, continuous blistering. |
|  |  |  |  | 30 | 650 | 550 | 2.4 |  |
| III | do | 17.5 | 11 | 30 | 650 | 550 | 2.4 | Much blistering. |
|  |  |  |  | 30 | 650 | 500 | 1.9 | Very bad coating, much blistering. |
|  |  |  |  | 30 | 650 | 450 | 2.1 | Do. |
| IV | 1% acetophenone | 17.4 | 7.0 | 30 | 650 | 500 | 2.0 | Good coating, some sandiness, very few blisters. |
|  |  |  |  | 30 | 750 | 500 | 2.0 |  |
|  |  |  |  | 30 | 750 | 550 | 2.1 |  |
| V | 2% acetophenone | 17.3 | 6.0 | 30 | 650 | 500 | 1.7 | Do. |
|  |  |  |  | 30 | 750 | 500 | 2.0 |  |
| VI | 1% benzophenone | 17.3 | 6.1 | 30 | 650 | 500 | --- | Good coating, some blistering. |
|  |  |  |  | 30 | 750 | 550 | --- |  |
| VII | 2% acetophenone | 28 | 51 | 30 | 700 | 500 | 2.0 | Good coating, a few blisters and a little sandiness. |
| VIII | do |  |  |  | 750 | 500 | 2.0 | Good coating, very slight sandiness, no blistering. |
| IX | do | 17.5 | 22 | 30 | 700 | 500 | 2.0 | Good coating, only slight sandiness, and a very few small blisters. |
|  |  |  |  |  | 750 | --- | 2.0 |  |

TABLE II.—SOLE COAT WIRE TESTS

| Example Number | Cosolvent | Percent solids | Viscosity, poises | Speed, f.p.m. | Cure temperature, °F. | Bot temperature, °F. | Build, mil | Comments |
|---|---|---|---|---|---|---|---|---|
| X | 4% N-butyl alcohol | 28.8 | 21.6 | 30 | 700 | 500 | 2.1 | Slight sandiness with an occasional small blister. |
|  |  |  |  |  | 750 | 500 | 2.1 |  |
|  |  |  |  |  | 750 | 550 | 2.1 |  |
| XI | 2% acetophenone, 4% isopropyl alcohol | 28.2 | 16.75 | 30 | 700 | 500 | 2.4 | Smooth, no sandiness. |
|  |  |  |  | --- | 750 | 500 | 1.9 |  |
|  |  |  |  | --- | 750 | 500 | 2.0 | Slight sandiness, 1 or 2 blisters. |
|  |  |  |  | 40 | 800 | 550 | 2.6 | Smooth, few small blisters. |
| XII | 4% isoamyl alcohol | 28.7 | 23 | 30 | 700 | 500 | 2.3 | Smooth, occasional small blisters. |
|  |  |  |  | 30 | 700 | 550 | 2.3 | Do. |
|  |  |  |  |  | 750 | 550 | 2.3 | Do. |
| XIII | 4% t-amyl alcohol | 28.7 | 32 | 30 | 750 | 550 | 1.9 | Very smooth, a few small blisters. |
|  |  |  |  | 40 | 800 | 575 | 1.9 |  |
| XIV | 2% acetophenone, 4% t-amyl alcohol | 28.9 | 31 | 30 | 700 | 550 | 1.8 | Very smooth, an occasional small blister. |
|  |  |  |  | 30 | 750 | 550 | --- | Very smooth, no blisters. |
|  |  |  |  | 40 | 800 | 585 | 1.9 | Do. |

TABLE III.—OVER COAT WIRE TESTS

| Example Number | Cosolvent | Percent solids | Viscosity, poises | Speed, f.p.m. | Cure temperature, °F. | Bot temperature, °F. | Build, mil | Comments |
|---|---|---|---|---|---|---|---|---|
| XV | None | 17.5 | 5.7 | 50 | 700 | 500 |  | Sandiness. |
|  |  |  |  | 60 | 700 | 500 | 2.7 | Sandiness plus imperfections. |
|  |  |  |  | 50 | 750 | 500 | 2.6 | Sandiness. |
|  |  |  |  | 50 | 800 | 500 | 2.6 | Do. |
| XVI | do | 17.5 | 8.3 | 50 | 750 | 500 | 2.6 | Few small blisters plus imperfections. |
|  |  |  |  | 50 | 800 | 500 | 2.4 |  |
| XVII | 1% acetophenone | 17.35 | 7.0 | 50 | 750 | 500 | 2.6 | Some sandiness, no blisters, good wire. |
|  |  |  |  | 50 | 650 | 500 | 2.7 |  |
| XVIII | do | 19.5 | 8.0 | 35 | 800 | 450 | 2.9 | Good wire, sandiness plus imperfections. |
|  |  |  |  | 40 | 800 | 450 | 2.8 | Good wire, some blisters. |
| XIX | 2% acetophenone | 19.5 | 8.0 | 40 | 800 | 450 | 2.8 |  |
|  |  |  |  | 50 | 800 | 450 |  | Good wire. |
| XX | 1% 4'methyl-acetophenone. | 19.5 | 8.0 | 40 | 800 | 450 | 3.0 |  |
| XXI | None | 17.5 | 5.4 | 50 | 800 | 450 | 2.4 | Good wire. |
|  |  |  |  | 60 | 800 | 450 |  | Blisters. |
| XXII | 2% p-ethylacetophenone. | 17.5 | 11.6 | 50 | 700 | 500 | 2.9 | Sandiness and occasional imperfections. |
|  |  |  |  | 50 | 750 | 550 |  |  |
| XXIII | 2% p-methylacetophenone. | 17.5 | 12.2 | 50 | 700 | 500 | 2.9 | Smooth wire. |
|  |  |  |  | 50 | 750 | 500 |  | Do. |
|  |  |  |  | 60 | 800 | 550 |  | Blistering. |
| XXIV | 2% dimethylacetophenone. | 17.5 | 12.0 | 50 | 700 | 500 | 3.0 | Occasional imperfections. |
|  |  |  |  | 50 | 750 | 500 |  | Do. |
|  |  |  |  | 50 | 750 | 550 | 2.9 | Sandiness and a few small blisters. |

TABLE IV.—OVER COAT WIRE TESTS

| Example Number | Cosolvent | Percent solids | Viscosity, poises | Speed, f.p.m. | Cure temperature, °F. | Bot temperature, °F. | Build, mil | Comments |
|---|---|---|---|---|---|---|---|---|
| XXV | None | 17.5 | 8.3 | 50 | 750 | 500 | 2.6 | A few small blisters. |
|  |  |  |  | 50 | 800 | 500 | 2.4 | Do. |
| XXVI | 1% acetophenone | 17.4 | 7.0 | 50 | 650 | 500 | 2.7 | A little sandiness, no blisters. |
|  |  |  |  | 50 | 750 | 500 | 2.6 | Good sample. |
| XXVII | 2% p-methyl-acetophenone. | 17.5 | 12.2 | 50 | 700 | 500 | 2.9 | Smooth wire, no blisters. |
|  |  |  |  | 50 | 750 | 500 | 2.9 | Do. |
| XXVIII | 2% dimethyl-acetophenone. | 17.5 | 12.0 | 50 | 700 | 500 | 3.0 | No blisters, occasional imperfections. |
|  |  |  |  | 50 | 750 | 500 |  |  |
| XXIX | 2% acetophenone | 27.2 | 18 | 50 | 700 | 500 | 3.2 | Very slight sandiness, no blisters. |
| XXX | 4% t-amyl alcohol | 27.2 | 18 | 50 | 700 | 500 | 3.2 | Smooth, no blisters or imperfections. |

I claim:

1. A magnet wire coating composition comprising (A) an amide-imide polymer, (B) phenol or a substituted phenol or ortho, meta or para cresol solvent system for said polymer and (C) aromatic ketones having a boiling range of about 200° C to 310° C. wherein the amount of the ketone added varies from about 0.1 to about 5% by weight of the magnet wire coating composition.

2. A magnet wire coating composition of claim 1 wherein the aromatic ketone is acetophenone.

3. A magnet wire coating composition of claim 1 wherein the aromatic ketone is benzophenone.

4. A magnet wire coating composition of claim 1 wherein the aromatic ketone is p-methylacetophenone.

5. A magnet wire coating composition of claim 1 wherein the aromatic ketone is dimethylacetophenone.

6. The magnet wire coating composition of claim 1 wherein the amount of ketone added is about 1 to 3 percent by weight of the total coating composition.

References Cited

UNITED STATES PATENTS

| | | | |
|---|---|---|---|
| 3,355,427 | 11/1967 | Loncrini | 260—47 |
| 3,544,504 | 12/1970 | Ulmer | 260—31.2 |
| 3,242,128 | 4/1966 | Chalmers | 260—32.6 |
| 3,347,808 | 10/1967 | Lavin | 260—29.1 |
| 3,554,984 | 1/1971 | George | 260—78 |
| 3,546,152 | 12/1970 | Bolton | 260—29.2 |

MORRIS LIEBMAN, Primary Examiner

R. ZAITLEN, Assistant Examiner

U.S. Cl. X.R.

260—33.4 P, 78 TF